(12) United States Patent
Mummenhoff

(10) Patent No.: US 6,688,206 B1
(45) Date of Patent: Feb. 10, 2004

(54) SAW BLADE WITH ELONGATED AIR PASSAGES

(75) Inventor: Heinrich Mummenhoff, Remscheid (DE)

(73) Assignee: Powertools International GmbH, Ellerbek (DE)

( * ) Notice: Subject to any disclaimer, the term of this patent is extended or adjusted under 35 U.S.C. 154(b) by 0 days.

(21) Appl. No.: 09/890,502

(22) PCT Filed: Jan. 31, 2000

(86) PCT No.: PCT/EP00/00765

§ 371 (c)(1),
(2), (4) Date: Jan. 8, 2002

(87) PCT Pub. No.: WO00/45985

PCT Pub. Date: Aug. 10, 2000

(30) Foreign Application Priority Data

Feb. 1, 1999 (DE) ..................................... 299 01 713 U

(51) Int. Cl.$^7$ ................................................. B26D 1/14
(52) U.S. Cl. .............................. 83/676; 83/835; 83/848
(58) Field of Search .......................... 83/171, 835, 676, 83/848; 125/15; 451/541, 548

(56) References Cited

U.S. PATENT DOCUMENTS

| | | | | | |
|---|---|---|---|---|---|
| 3,700,016 | A | * | 10/1972 | Strobel .......................... | 83/848 |
| 3,730,038 | A | * | 5/1973 | Farb .............................. | 83/835 |
| 3,981,216 | A | * | 9/1976 | Lemmon ...................... | 83/848 |
| 4,257,301 | A | * | 3/1981 | Tuomaala ..................... | 83/835 |
| 4,333,371 | A | * | 6/1982 | Matsuda ....................... | 83/169 |
| 4,407,178 | A | * | 10/1983 | Storzer ......................... | 83/835 |
| 4,516,560 | A | * | 5/1985 | Cruickshank et al. ......... | 125/15 |
| 4,574,676 | A | * | 3/1986 | Jansen-Herfeld .............. | 83/835 |
| 4,624,237 | A | * | 11/1986 | Inoue ............................ | 125/15 |
| 5,040,341 | A | * | 8/1991 | Okinaga ....................... | 451/541 |
| 5,351,595 | A | * | 10/1994 | Johnston ....................... | 83/848 |
| 5,411,010 | A | * | 5/1995 | Mummenhoff ................ | 125/15 |
| 5,758,561 | A | * | 6/1998 | Curtsinger et al. ............ | 83/835 |

* cited by examiner

Primary Examiner—Allan N. Shoap
Assistant Examiner—Phong Nguyen
(74) Attorney, Agent, or Firm—Goodman & Teitelbaum, Esqs.

(57) ABSTRACT

A saw blade for a circular saw has a circular disk with a predetermined radius and a predetermined thickness. Teeth are arranged on the circumference of the circular disk and elongated air passages are provided in the substantially circular side faces of the circular disk. The saw blade has two parallel saw blades that are driven in coaxially opposite directions. In order to improve the operational behavior of the saw blade, especially in its thermal characteristics while providing a high mechanical stability, a respective longitude of the elongated air passages extends in a selected direction to lie in an area that extends from a first direction of a secant intersecting the side faces to a second direction of a circumferential arch in the side faces. The elongated air passages are located in an outer region defined by a ring area. The outer border of the ring area is provided by the circumference of an outer circle having a radius in the order of about 0.75 to 0.95 times the radius of the circular disk. The inner border of the region is provided by the circumference of a first inner circle having about half the radius of the circular disk.

17 Claims, 2 Drawing Sheets

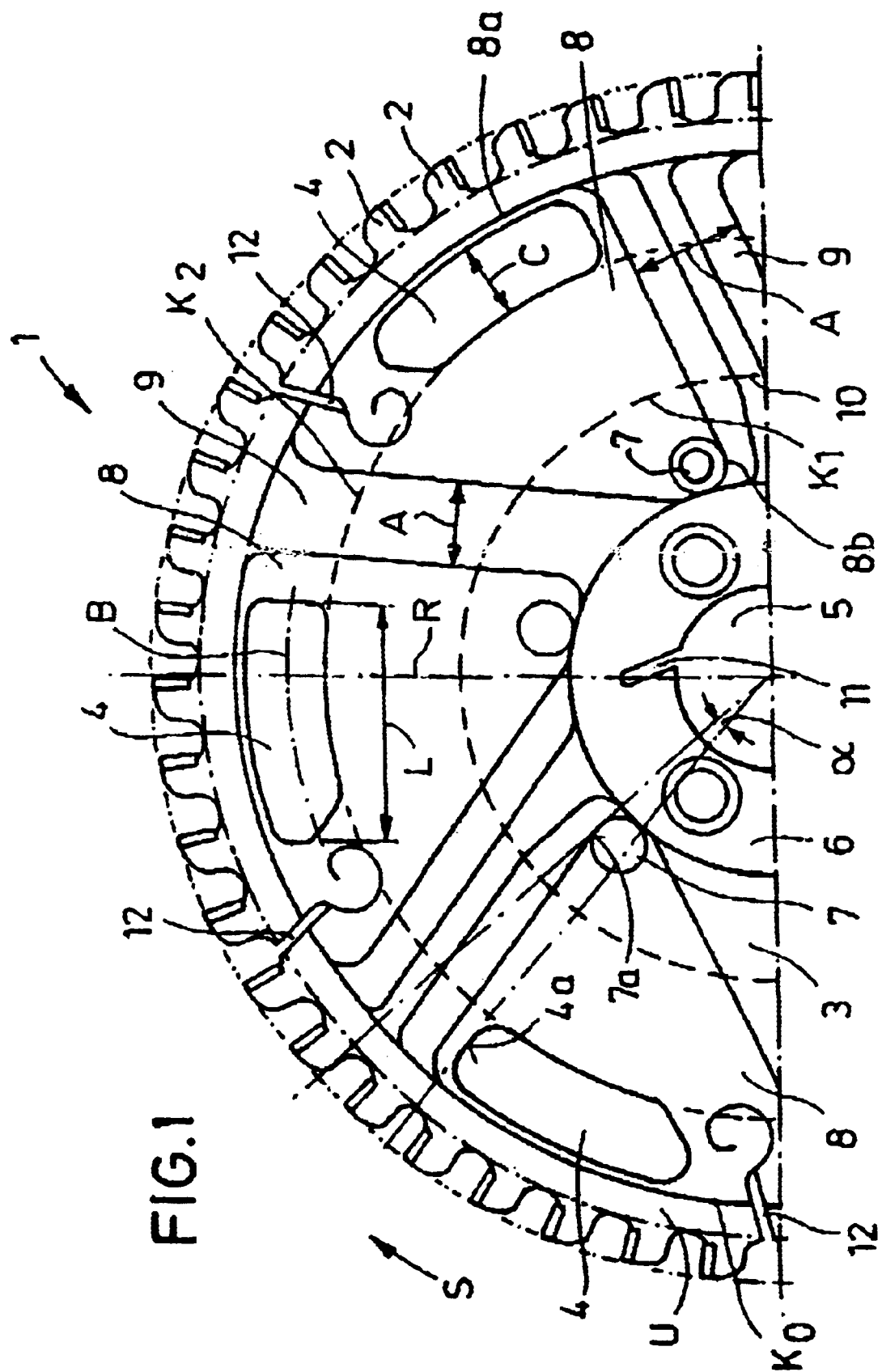

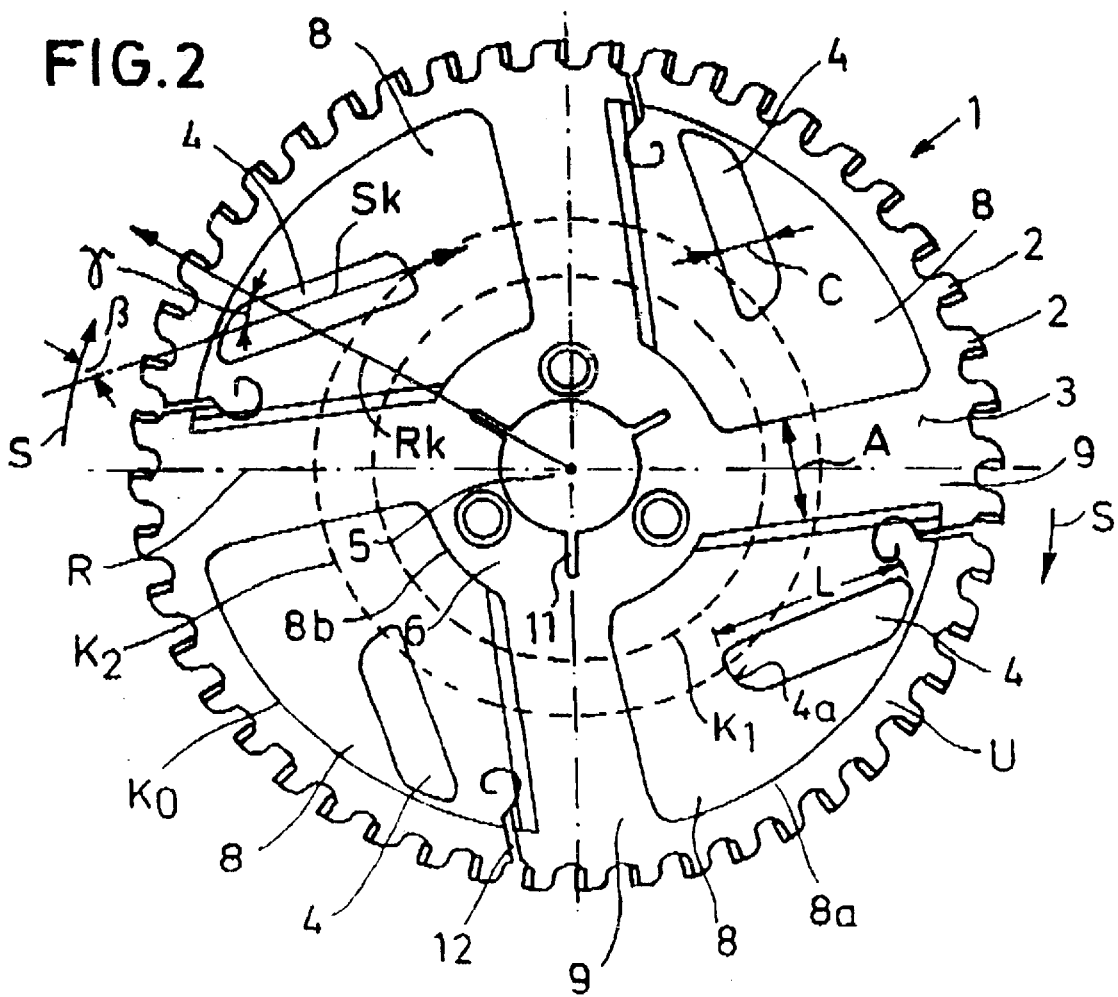
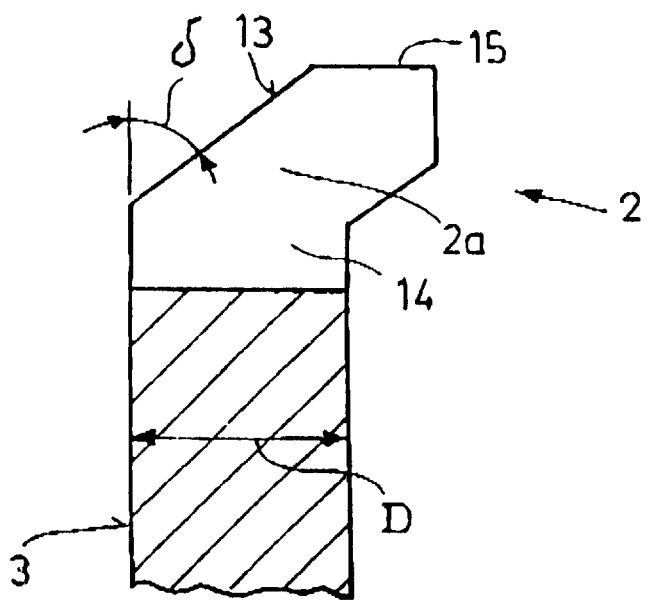

SAW BLADE WITH ELONGATED AIR PASSAGES

BACKGROUND OF THE INVENTION

The invention relates to a saw blade for a circular saw, which is designed as a circular disc provided with a radius and a thickness, and also with teeth being arranged on the circumference of the circular disc, and air passage openings in the form of elongate holes being arranged in its essentially circular side faces. A saw blade of this kind is intended, in particular, for use with a circular saw having two parallel saw blades that can be driven coaxially in mutually opposite directions of rotation.

A saw blade of this kind is known, for example, from International Patent Application WO 97/13609. In this application, air passage openings in the form of elongate holes that are aligned essentially radially and extend as far as the centre of rotation of the saw blade, in particular openings that are approximately banana-shaped in cross section, are described in the saw blade (to prevent magnetization).

A saw blade of the type described at the outset is preferably suitable for use for a circular saw with two parallel saw blades that can be driven coaxially in mutually opposite directions of rotation, as proposed in German Utility Model Application DE 298 04 220.7. As regards further possible details and embodiments of a circular saw of this kind and of a saw blade according to the invention that are not described below, attention is drawn to this application in its entirety.

According to this German utility model application, low-wear and trouble-free operation is ensured for a cutting device, in particular for a circular saw of the type stated at the outset here, by structurally simple and low-cost measures. This is achieved by mechanical holding means for the cutting elements (saw blades) of a design such that a gap that prevents friction is necessarily guaranteed between the cutting elements in the assembled state. This eliminates the need to produce a pressure cushion between the saw blades. The gap is ensured purely by the mechanical mounting of the saw blades, the holding means being designed in such a way, expediently being adapted to the dimensions, in particular the thickness, of the saw blades, that the gap between the cutting elements in the assembled state—especially in the region of teeth arranged on the outer circumference—has a clear width in a range of at least 2/100 mm to at most about 1/10 mm. Such a clearance, on the one hand, ensures that there is virtually no friction between the cutting elements even during operation and, on the other hand, avoids a situation where pieces of material (chips) removed during the cutting operation might force themselves between the saw blades and then push them apart, by a wedging effect.

Neither the saw blade described in International Patent Application WO 97/13609 nor that described in German Utility Model Application DE 298 04 220.7 is ideal as regards dissipation of the heat that arises during the cutting operation. Another disadvantage with the known saw blade with the radial slots is that, in the case of a firmly clamped saw blade, its stability is reduced by the slots.

BRIEF SUMMARY OF THE INVENTION

The object on which the invention is based is to improve a saw blade of the type stated at the outset in terms of its running behaviour, taking into account, in particular, its thermal characteristics, while ensuring high mechanical stability.

According to the invention, this is achieved by a saw blade of the type stated at the outset in which a respective longitudinal extent of the air passage openings in the form of elongate holes extends in a direction that lies within a range that extends from a direction of extension of a secant through the side faces to the direction of extension of a circumferential arc in the side faces, the air passage openings in the form of elongate holes lying in an outer region formed by an annular area, the outer boundary of which is formed by the circumference of a circle with a radius of the order of about 0.75 to 0.95 times the radius of the circular disc, and the inner boundary of which is formed by the circumference of a circle whose radius is half that of the circular disc.

Such a saw blade advantageously has, on the one hand, a high stability since the air passage openings do not reduce this, and, on the other hand, it has enhanced running properties thanks to optimized dissipation of the heat that arises during sawing.

The saw blade according to the invention is particularly efficient if the air passage openings in the form of elongate holes extend essentially in a direction parallel to the circumference, i.e. intersect the radius of the circular disc at a right angle. Moreover, it is advantageous, in particular, if the inner boundary is formed by the circumference of a circle with a radius that is two-thirds the size of the radius of the circular disc. By virtue of this embodiment, the majority of the heat that arises is dissipated in the very location in which it arises, and any significant conduction of heat into the certre of rotation of the saw blade is prevented.

Further advantageous embodiment features of the invention are set forth below in the following description.

BRIEF DESCRIPTION OF THE SEVERAL VIEWS OF THE DRAWINGS

The invention will be explained in greater detail in the form of two exemplary embodiments with reference to the drawing, in which:

FIG. 1 shows a side view of a first embodiment of a saw blade according to the invention for a circular saw, FIG. 2 shows a side view of a second embodiment of a saw blade according to the invention for a circular saw, FIG. 3 shows a view of a tooth face of a saw blade according to the invention, which is not to scale.

In the various figures of the drawing, identical parts are always provided with the same reference numerals and are therefore each generally described only once.

DETAILED DESCRIPTION OF THE INVENTION

The first embodiment of a saw blade, illustrated in FIG. 1, shows first of all, that a saw blade according to the invention is designed as a circular disc 1 with a radius R and a thickness D (FIG. 3), with teeth 2 being arranged on the circumference of the circular disc 1 and air passage openings 4 in the form of elongate holes being arranged in its essentially circular side faces 3. As already mentioned, such a saw blade according to the invention can be used, in particular, in a circular saw with two parallel saw blades that can be driven coaxially in mutually opposite directions of rotation S.

The first embodiment of a saw blade according to the invention shows that a respective longitudinal extent of the air passage openings 4 in the form of elongate holes runs in a direction that extends along a circumferential arc B in the side faces 3, the air passage openings 4 in the form of elongate holes lying in an outer region formed by an annular area, the outer boundary of which is formed by the circumference of an outer circle $K_O$ with a radius. of the order of about 0.75 to 0.95 times the radius R of the circular disc 1, and the inner boundary of which is formed by the circumference of a first inner circle $K_1$ whose radius R is about half that of the circular disc 1. The outer boundary ($K_O$) ensures that there is a sufficiently wide stabilizing circumferential border U remaining between the teeth 2 and the region of the air passage openings 4 in the form of elongate holes. The air passage openings 4 in the form of elongate holes extend essentially in a direction parallel to the circumference, i.e. each intersects the radius of the circular disc at a right angle.

As illustrated, the inner boundary of the annular area is formed, in particular, by the circumference of a second inner circle $K_2$ with a radius that is two-thirds the size of the radius R of the circular disc 1. This positioning of the air passage openings 4 in the form of elongate holes is an effective means of preventing conduction of heat as far as the centre of rotation of the saw blade.

In the first embodiment illustrated, the saw blade has six air passage openings 4 in the form of elongate holes. This number can vary. From three to twelve air passage openings 4 can also be implemented with advantage.

The width C of the air passage openings 4 in the form of elongate holes is in a range of about 0.09 to 0.17 times, preferably about 0.11 to 0.14 times, the radius R of the circular disc 1. The sum of the lengths L of the air passage openings 4 in the form of elongate holes is approximately in a range of 0.2 to 0.6 times, preferably 0.4 times, the circumferential length of the circular disc 1. The dimensions in the region illustrated represent optimized values for a saw blade according to the invention.

As also proposed in German Utility Model Application DE 298 04 220.7, a mounting region 6 is provided for mechanical holding means, in particular, a mounting region having a central opening 5, is arranged in a region of a circular area, the outer boundary of which is formed by the circumference of the circle $K_1$ with, at most, half of the radius R of the circular disc 1, this region serving, in particular, for contact with and centring of a holding flange that can be connected releasably to the circular disc 1. The mechanical holding means for the saw blade ensure that there is a gap between two saw blades in the assembled state to prevent friction. In the case of the teeth 2 arranged on the outer circumference, this gap can have a clearance width in a range of at least 2/100 mm to at most about 1/10 mm. As already mentioned, such a clearance, on the one hand, ensures that there is virtually no friction between the saw blades during operation and, on the other hand, avoids a situation where chips removed during the cutting operation force themselves between the saw blades.

Further (smaller) air passage openings 7, which are, in particular, of circular design, are arranged in an inner region of the side faces 3, in particular directly adjoining the mounting region 6 for mechanical holding means as seen in the radial direction. Each outer air passage opening 4 in the form of an elongate hole essentially close to the circumference is assigned an inner air passage opening 7 essentially remote from the circumference. As a result, the centrifugal forces that arise advantageously give rise to air flow from the inside outwards, promoting heat dissipation, during the rotation of the saw blade according to the invention.

FIG. 1 furthermore shows that a front boundary 4a of the outer air passage openings 4, which points in the direction of rotation S, is offset counter to the direction of rotation S relative to a front boundary 7a of the associated inner air passage openings 7, which points in the direction of rotation S, by an angle α of about 5° to 35° in each case, promoting advantageous formation of the air flow.

The inner air passage openings 7 can advantageously be counterbored on one side, in particular in the side face 2 that faces the second saw blade during assembly, for precisely this purpose.

FIG. 1 furthermore shows that pocket-type depressions 8, in which the outer air passage openings 4 are arranged, preferably on the outer edge 8a of the depressions 8, and the inner air passage openings 7 are arranged, preferably on the inner edge 8b of the depressions 8, are formed in the side face 3 of the circular disc 1 shown in the plan view. (In particular, this can once again be the side face 3 that faces the second saw blade during assembly.) The pocket-type depressions 8 are used to ensure optimum guidance of the air and likewise promote heat dissipation by convection.

The depth of the pocket-type depressions 8 can advantageously be about 0.08 to 0.12 times the thickness D of the circular disc 1. This does not prejudice the mechanical stability of the saw blade. This applies even if the pocket-type depressions 8 are formed on both side faces 3 of the circular disc 1.

Extending between the pocket-type depressions 8 (with the advantages of stabilization and a large degree of segmentation of the individual air flows from the inner air passage openings 7 to the outer air passage openings 4) are ribs 9, the height of which is reduced relative to the thickness D of the circular disc 1, in particular by approximately 0.01 to 0.03 times the thickness D of the circular disc 1. The ribs 9 start from the mounting region 6 for mechanical holding means and extend centrifugally outwards, pointing counter to the direction of rotation S. A mean width A of the ribs 9 can be at least approximately 0.15 times the radius R of the circular disc 1.

Channel-type depressions 10, which can advantageously perform the function of lubricant channels, can be arranged within at least some (or even all) of the ribs 9. The depth of these channel-type depressions 10 can advantageously be exactly the same, for instance, as that of the pocket-type depressions B. Optimum lubricant transport is promoted by the path of the ribs 9 and hence of the channel-type depressions 10 that is described above, which points counter to the direction of rotation S and leads centrifugally outwards, thanks to the action of inertia forces. The use of a lubricant or a coolant/lubricant serves to reduce friction, reduces the amount of heat to be dissipated that arises during sawing and dissipates this heat more quickly owing to the fact that it has a larger heat capacity than air.

The lubricant can advantageously be supplied by means of slots 11 extending centrifugally outwards in the mounting region 6 for mechanical holding means, and, in particular, the slots 11 can start from the central opening 5 and can extend outwards, pointing counter to the direction of rotation S.

In addition, as FIG. 1 shows, expansion slots 12 known per se can be provided in the circumferential region of the circular disc 1, the slots having a form similar to that of a clef in both exemplary embodiments. These expansion slots 12 compensate for the negative effects of the heat that arises in the circumferential region (thermal expansion).

The second embodiment of a saw blade according to the invention, which is illustrated in FIG. 2, differs from the first embodiment, in particular in the shape of the air passage openings 4 in the form of elongate holes. Here, these extend essentially in the direction of a secant Sk through the side face 3 of the circular disc 1. In its essentially centrally extending direction (arrow), the secant Sk intersects both the direction of rotation S at an acute angle β and a radial ray Rs at an acute angle γ. The angle (β) between the secant (Sk) and the direction of rotation (S) is smaller than about 55° and is preferably in a range of about 10° to 30°, and the angle γ between the secant Sk and the radial ray Rs is no less than about 45°, with the optimum range being about 60° to 80°. With this embodiment too, it is possible, on the one hand, to achieve a high stability of the saw blade according to the invention and, on the other hand, to achieve extremely favourable running properties through optimized heat dissipation.

In the second embodiment of the invention, as in the first embodiment, pocket-type depressions 8 with ribs 9 in between but no additional inner air passage openings 7 are formed. In this embodiment, the saw blade has four air passage openings 4 in the form of elongate holes.

Another advantageous feature of a saw blade according to the invention can be discerned from FIG. 3. This shows a view of a face 2a of a tooth 2 of a saw blade according to the invention, the face not being shown to scale for the sake of clarity, in particular being compressed in the vertical direction. From the illustration, it can be seen that at least one flank surface 13 of the teeth 2 in each case can have a slope that recedes from the circumferential border U of the side face 3 of the circular disc 1, in each case from a root 14 of the teeth 2 towards a tip 15 of the teeth 2, expediently on the side of the circular disc 1 that faces the second saw blade during assembly. Such a slope reliably counteracts the negative effects of the heat that arises in the region of the teeth (thermal expansion), reliably excluding the possibility that the teeth 2 of the two saw blades will collide during operation of a saw with two parallel saw blades that can be driven coaxially in mutually opposite directions of rotation S—even with the very small possible clearances described.

The flank surface 13 of the teeth 2 that recedes from the circumferential border U of the side face 2 of the circular disc can advantageously slope at an angle δ within a range of about 1° to 4°, preferably from 2° to 3°, to the side face 2 of the circular disc 1 at the circumferential border 16 (thickness D).

The invention is not limited to the exemplary embodiments described but also includes all embodiments with an equivalent action in the sense of the invention. It will thus already be apparent from the exemplary embodiments that there are, for example, many possibilities for the positioning and design of the air passage openings 4 in the form of elongate holes. In particular, these are designs that are intermediate between the two exemplary embodiments illustrated. That is to say that the direction of the respective longitudinal extent of the air passage openings 4 in the form of elongate holes can lie within a range that can vary between the direction of extension of a secant Sk through the side faces 3 (as in the second example) and the direction of extension of a circumferential arc B in the side faces 3 (as in the first example). The air passage openings 4 in the form of elongate holes can have a straight or curved form. In this way, on the one hand, a saw blade with a high stability is achieved and, on the other hand, the movement of air that arises is directed centrifugally outwards, preferably counter to the direction of rotation S, ensuring efficient heat dissipation in the immediate vicinity of heat generation, thereby improving the running properties of the saw blade according to the invention in comparison with known saw blades of the type stated at the outset.

The above information on the depth of the pocket-type depressions 8, the height of the ribs 9, the depth of the channel-type depressions 10 etc., given in relation to the thickness D of the circular disc 1, represents optimum values for circular discs 1 with a thickness D within a range of about 1.2 mm to 2.0 mm, in particular 1.5 mm to 1.8 mm. If the thickness is greater than 2.0 mm, it may be expedient to provide smaller values for these variables in relation to the thickness D by using the absolute values calculated for 2.0 mm for the circular disc 1 with the greater thickness, for example.

Furthermore, the invention is not restricted to the combination of features defined in claim 1 but can also be defined by any other combination of particular features among all the individual features disclosed. This means that, in principle, virtually any individual feature of claim 1 can be omitted or replaced by at least one individual feature disclosed at some other point in the application. To this extent, claim 1 should be understood merely as an initial attempt at a form of words to describe the invention.

What is claimed is:

1. Saw blade for use in a circular saw having two parallel saw blades that can be driven coaxially in mutually opposite directions of rotation (S), the saw blade having a circular disc (1) with a predetermined radius (R) and a predetermined thickness (D), comprising:

teeth (2) being arranged on a circumference of the circular disc (1), and air passage openings (4) being constructed as elongated holes and being arranged in substantially circular side faces (3) of the circular disc (1);

a respective longitudinal extent of the air passage openings (4) extending in a direction of a circumferential arc (B) in the side faces (3) substantially parallel to the circumference of the circular disc (1) and intersecting the radius (R) of the circular disc (1) at a right angle thereto;

the air passage openings (4) lying in an outer region defined by an annular area, an outer boundary of the annular area being provided by a circumference of an outer circle ($K_0$) having a radius on the order of about 0.75 to 0.95 times the predetermined radius (R) of the circular disc (1), and an inner boundary of the annular area being provided by a circumference of an inner circle ($K_1$) ($K_2$) having a radius about at least half the predetermined radius (R) of the circular disc (1);

the air passage openings (4) having a width (C) that is in a range of about 0.09 to 0.17 times the radius (R) of the circular disc (1);

the air passage openings (4) being arranged on an outer edge (8a) of pocket-type depressions (8);

each of the air passage openings (4) being assigned one inner air passage opening (7) substantially remote from the circumference of the circular disc (1);

the inner air passage openings (7) being circular and being arranged in an inner region of the side faces (3) directly adjoining an inner mounting-region (6) in a radial direction;

the inner air passage openings (7) being arranged on an inner edge (8b) of the depressions (8);

the inner air edge (8b) and the inner air passage openings (7) being provided at least in the side face (3) of the circular disc (1) that faces a second saw blade during assembly;

ribs (9) extending between the pocket-type depressions (8), the ribs (9) starting from the inner mounting region (6) and extending centrifugally outward to point counter to the direction of rotation (S); and channel-type depressions (10) being arranged within a plurality of the ribs (9).

2. Saw blade according to claim 1, wherein the radius of the inner circle ($K_2$) is two-thirds the predetermined radius (R) of the circular disc (1).

3. Saw Blade according to claim 1, wherein three to twelve air passage openings (4) are provided in the circular side faces (3) of the circular disc (1).

4. Saw blade according to claim 1, wherein the width (C) of the air passage openings (4) is in a range of about 0.11 to 0.14 times the radius (R) of the circular disc (1).

5. Saw blade according to claim 1, wherein a sum of lengths (L) of the air passage openings (4) is approximately in a range of 0.2 to 0.6 times a circumferential length of the circular disc (1).

6. Saw blade according to claim 1, wherein the inner mounting region (6) has a central opening (5), the inner mounting region (6) is arranged in a circular area, an outer boundary of the circular area being, at most, almost half of the predetermined radius (R) of the circular disc (1), the mounting region (6) contacting and centering a holding flange to define mechanical holding means for providing a releasable connection to the circular disc (1).

7. Saw blade according to claim 1, wherein a front boundary (4a) of the air passage openings (4) points in the direction of rotation (S) and is offset counter to the direction of rotation (S) relative to a front boundary (7a) of associated ones of the inner air passage openings (7), which also points in the direction of rotation (S) by an angle of about 5° to 35° in each case.

8. Saw blade according to claim 1, wherein the inner air passage openings (7) are counterbored in the side face (3) that faces a second saw blade during assembly.

9. Saw blade according to claim 1, wherein each of the pocket-type depressions (8) has a depth of about 0.08 to 0.12 times the predetermined thickness (D) of the circular disc (1).

10. Saw blade according to claim 1, wherein each of the ribs (9) has a height approximately 0.01 to 0.03 times the predetermined thickness (D) of the circular disc (1).

11. Saw blade according to claim 1, wherein a mean width (A) of the ribs (9) is at least approximately 0.15 times the predetermined radius (R) of the circular disc (1).

12. Saw blade according to claim 1, wherein each of the channel-type depressions (10) has a depth of about 0.08 to 0.12 times the predetermined thickness (D) of the circular disc (1).

13. Saw blade according to claim 1, wherein a number of slots (11) are arranged in the inner mounting region (6) starting from a central opening (5) therein and extending centrifugally outwards.

14. Saw blade according to claim 13, wherein the slots (11) point counter to the direction of rotation (S).

15. Saw blade according to claim 1, wherein expansion slots (12) are provided in a circumferential region of the circular disc (1).

16. Saw blade according to claim 1, wherein at least one flank surface (13) of the teeth (2), in each case, has a slope that recedes from a circumferential border (U) of the side face (3) of the circular disc (1), and, in each case, the slope extends from a root (14) towards a tip (15) of the teeth (2) on the side face (3) of the circular disc (1) that faces a second saw blade during assembly thereof.

17. Saw blade according to claim 16, wherein the at least one flank surface (13) of the teeth (2) slopes at an angle within a range of about 1° to 4° to the side face (3) of the circular disc (1) at the circumferential border (U).

* * * * *